United States Patent
Edwards et al.

(10) Patent No.: US 9,218,096 B2
(45) Date of Patent: *Dec. 22, 2015

(54) SENSING METHODS FOR TOUCH SENSING DEVICES

(71) Applicant: INNOLUX CORPORATION, Chu-Nan (TW)

(72) Inventors: Martin John Edwards, Crawley (GB); John Richard Ayres, Surrey (GB)

(73) Assignee: INNOLUX CORPORATION, Chu-Nan (TW)

(*) Notice: Subject to any disclaimer, the term of this patent is extended or adjusted under 35 U.S.C. 154(b) by 110 days.

This patent is subject to a terminal disclaimer.

(21) Appl. No.: 14/044,755

(22) Filed: Oct. 2, 2013

(65) Prior Publication Data

US 2014/0028623 A1  Jan. 30, 2014

Related U.S. Application Data

(63) Continuation of application No. 12/955,118, filed on Nov. 29, 2010, now Pat. No. 8,665,231.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ..... G06F 3/044; G06F 3/0416; G06F 3/0418; H03K 17/962; H03K 2217/9607; H03K 2217/96074; H03K 2217/960745

USPC ....................................... 345/174; 178/18.06
See application file for complete search history.

(56) References Cited

U.S. PATENT DOCUMENTS

| | | | |
|---|---|---|---|
| 2007/0257890 A1 | 11/2007 | Hotelling et al. | |
| 2009/0009486 A1* | 1/2009 | Sato et al. | 345/174 |
| 2009/0315858 A1* | 12/2009 | Sato et al. | 345/174 |
| 2010/0085325 A1 | 4/2010 | King-Smith et al. | |
| 2011/0043478 A1 | 2/2011 | Matsushima | |
| 2012/0062508 A1* | 3/2012 | Liu et al. | 345/174 |
| 2012/0133594 A1* | 5/2012 | Edwards et al. | 345/173 |
| 2012/0146943 A1 | 6/2012 | Fairley et al. | |
| 2014/0210491 A1* | 7/2014 | Jonsson | 324/661 |

FOREIGN PATENT DOCUMENTS

| | | |
|---|---|---|
| TW | 200912439 | 3/2009 |
| TW | 201011620 | 3/2010 |
| TW | 201113794 | 4/2011 |

* cited by examiner

*Primary Examiner* — Tom Sheng
(74) *Attorney, Agent, or Firm* — Liu & Liu

(57) ABSTRACT

A sensing method for a touch sensing device is provided. In one embodiment, for one set of interlaced receiving electrode and transmitting electrodes of the touch sensing device, an integrator coupled to the receiving electrode is reset only one time. In another embodiment, for each group of sensing electrodes, an integrator coupled to the sensing electrodes is reset only one time. Accordingly, the rate at which the touch sensing array is sensed may be increased. Noise reduced by the process of resetting the integrator due to charge injection effects may be decreased.

19 Claims, 16 Drawing Sheets

SENSING METHODS FOR TOUCH SENSING DEVICES

CROSS REFERENCE TO RELATED APPLICATIONS

The present application is a continuation application of and claims priority from U.S. patent application Ser. No. 12/955,118, filed Nov. 29, 2010, the content of which is hereby incorporated by reference in its entirety.

BACKGROUND OF THE INVENTION

1. Field of the Invention

The invention relates to a sensing method, and more particularly to a sensing method for a touch sensing device.

2. Description of the Related Art

FIG. 1 shows a conventional capacitive touch sensing array. As shown in FIG. 1, a touch sensing array 1 comprises a plurality of sensing electrodes grouped into vertical sensing electrodes and horizontal sensing electrodes which interlace with the vertical electrodes. In FIG. 1, five vertical sensing electrodes V1~V5 and five horizontal sensing electrodes H1~H5 are given as an example. When a conductive object, such as a conductive stylus or a finger, touches the touch sensing array 1, a sensing circuit connected to the sensing electrodes can detect the location of the object by measuring changes in capacitances associated with the electrodes and the object. The measured capacitances may be cross-capacitances between interlaced vertical sensing electrodes and the horizontal sensing electrodes or self-capacitances of the respective sensing electrodes. For the two types of the measured capacitances, the values of the capacitances are affected by the presence of the object.

The changes in the capacitances associated with the sensing electrodes can be measured by a charge integrator circuit of the sensing circuit. In order to perform measurement of a cross-capacitance between one set of the interlaced vertical and horizontal sensing electrodes, a charge integrator circuit is connected to the measured vertical sensing electrode. The charge integrated by the charge integrator circuit depends on the value of the corresponding cross-capacitance. At the beginning of the measurement of each set of the interlaced vertical and horizontal sensing electrodes, the charge integrator circuit has to be reset. In order to perform measurement of a self-capacitance of one sensing electrode (one vertical or horizontal sensing electrode), a charge integrator circuit is connected to the measured sensing electrode. The charge integrated by the charge integrator circuit depends on the value of the corresponding self-capacitance. Similarly, at the beginning of the measurement of each sensing electrode, the charge integrator circuit has to be reset. In the two different cases, the process of resetting the charge integrator circuit takes some time, which limits the rate at which the touch sensing array is sensed. Moreover, the process of resetting the charge integrator circuit also generates noise due to charge injection effects.

Thus, it is desired to provide a new scanning method for a touch sensing array to measure capacitances induced by touching.

BRIEF SUMMARY OF THE INVENTION

An exemplary embodiment of a sensing method (Cross capacitance measurement, FIGS. 2-5C) for a touch sensing device (2) is provided. The touch sensing device comprises a touch sensing array and an integrator. The touch sensing array comprises a plurality of receiving electrodes (R1~Rm) disposed successively and a plurality of transmitting electrodes (T1~Tn) disposed successively and interlacing with the receiving electrodes. The sensing method comprises the steps of: (S40) selecting one of the receiving electrodes to serve as a current receiving electrode (R1); (S41) connecting the current receiving electrode to the integrator; (S42) resetting the integrator; and measuring output signals corresponding to the current receiving electrode and the transmitting electrodes. The step of measuring the output signals corresponding to the current receiving electrode and the transmitting electrodes comprises the steps of: (S450) providing a first voltage (V51) to a previous transmitting electrode (T1) among the transmitting electrodes; (S451) measuring an output voltage of the integrator in response to the first voltage on the previous transmitting electrode to obtain a previous integration value (INT51); (S453) providing a second voltage (V52) to a current transmitting electrode (T2) among the transmitting electrodes, wherein the second voltage is different from the first voltage; (S454) measuring the output voltage of the integrator in response to the current voltage on the second transmitting electrode by the integrator to obtain a current integration value (INT52); and (S455) calculating the difference between the previous integration value and the current integration value to obtain the output signal (Vout52) corresponding to the current receiving electrode and the current transmitting electrode.

Another exemplary embodiment of a sensing method (self-capacitance measurement, FIG. 5-8) for a touch sensing device (7) is provided. The touch sensing device comprises a touch sensing array (70) and an integrator (712). The touch sensing array comprises a plurality of first sensing electrodes (V1~Vm/H1~Hn) disposed successively. The sensing method comprises the steps of: (S90) resetting the integrator; and measuring output signals corresponding to the first sensing electrodes. The step of measuring the output signals corresponding to the first sensing electrodes comprises the step of: (S920) pre-charging a previous first sensing electrode (Vpc1) among the first sensing electrodes to a first voltage; (S921) connecting the previous first sensing electrode to the integrator; (S922) measuring an output voltage of the integrator to obtain a previous first integration value (INT101); (S924) pre-charging a current first sensing electrode among the first sensing electrodes to a second voltage (Vpc2), wherein the second voltage is different from the first voltage; (S925) connecting the current first sensing electrode to the integrator; (S926) measuring the output voltage of the integrator to obtain a current first integration value (INT102); and (S927) calculating the difference between the previous first integration value and the current first integration value to obtain the output signal corresponding to the current first sensing electrode.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
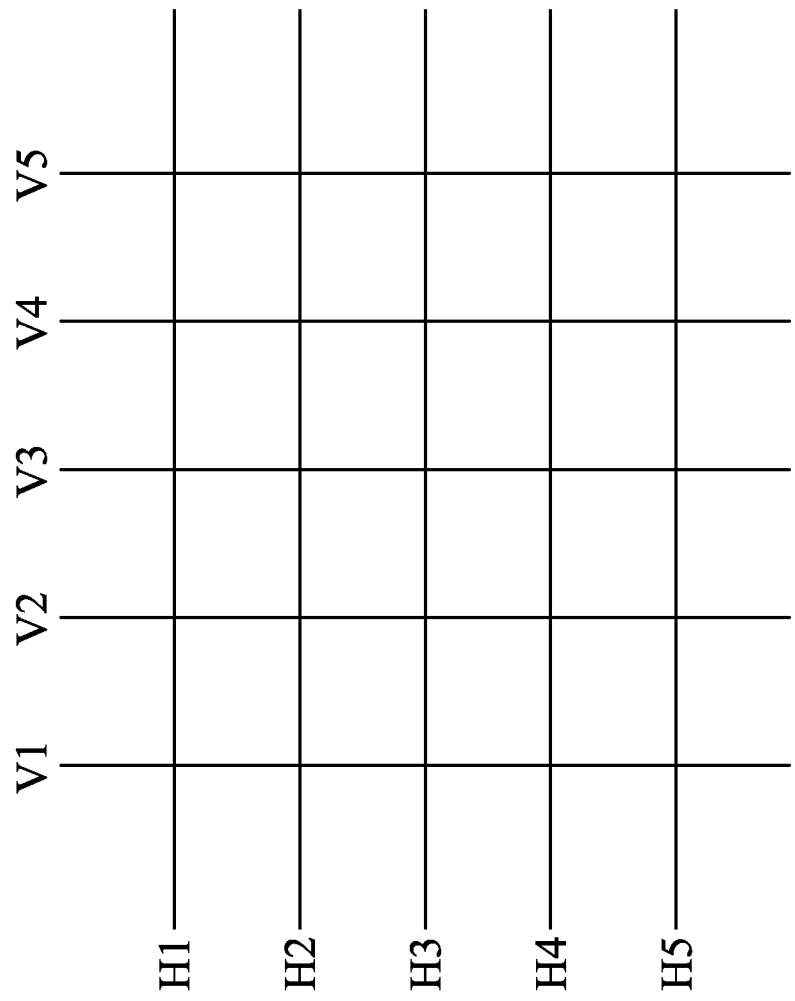
FIG. 1 shows a conventional capacitive touch sensing array.
Figure 2:
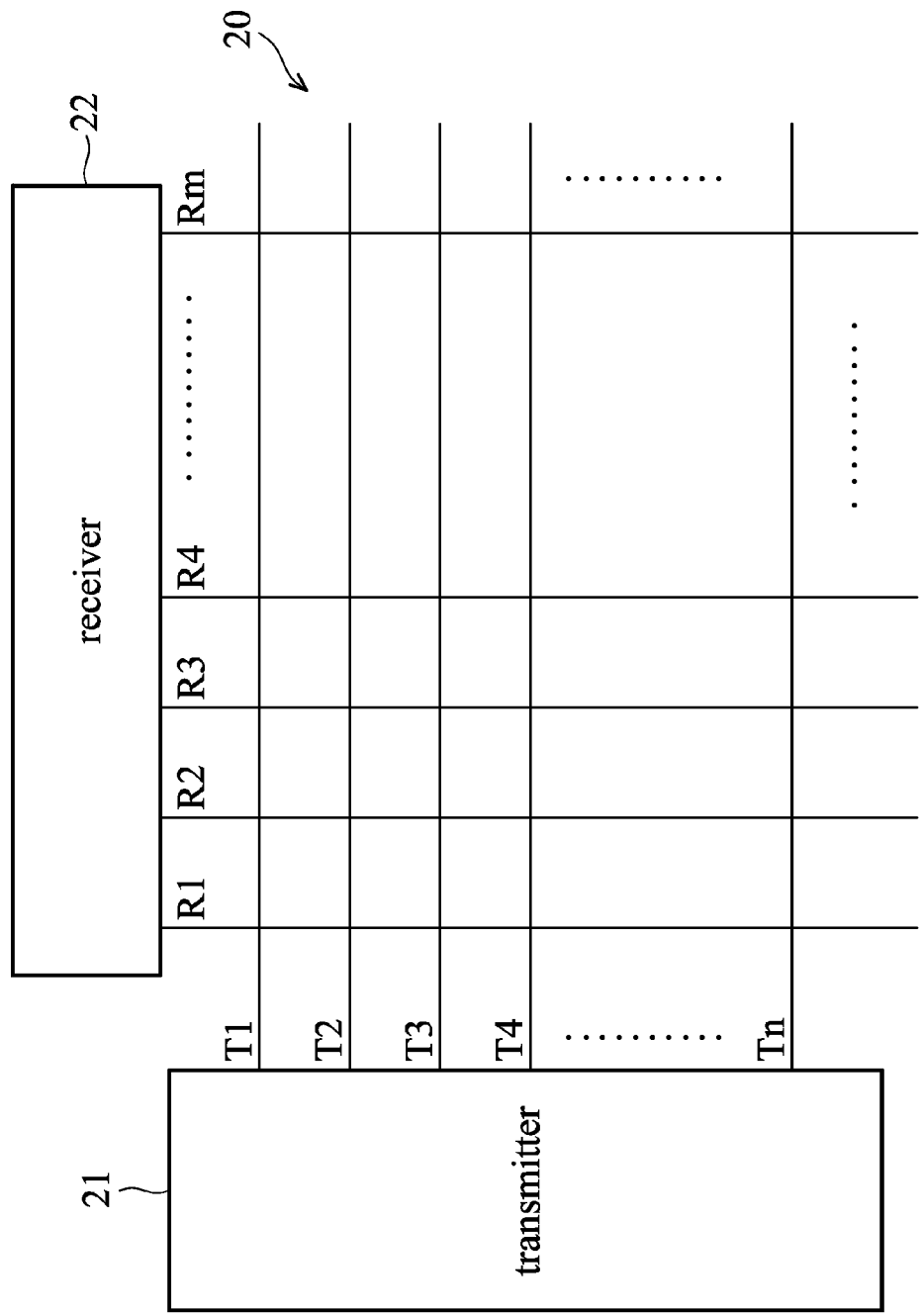
FIG. 2 shows an exemplary embodiment of a touch sensing device.
Figure 3:
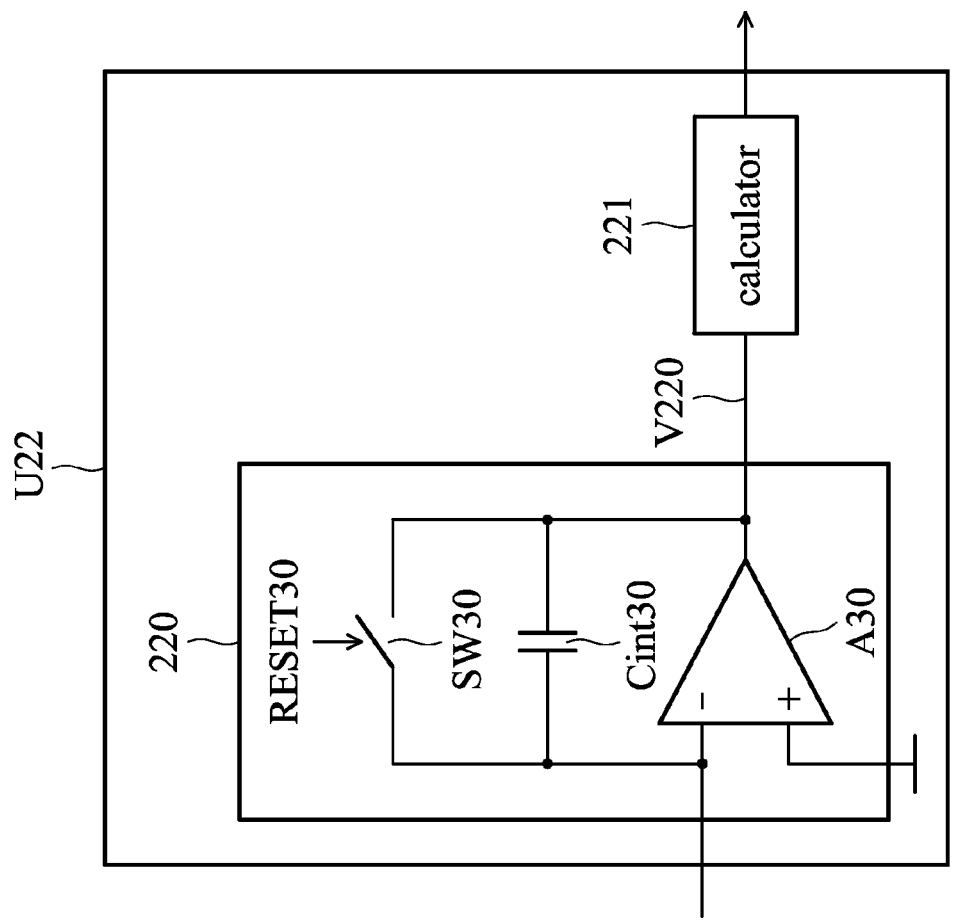
FIG. 3 shows an exemplary embodiment of a receiver of the touch sensing device in FIG. 2.

Touch sensing devices and sensing methods thereof are provided. In an exemplary embodiment of a touch sensing device in FIG. 2, a touch sensing device 2 comprises a touch sensing array 20, a transmitter 21, and a receiver 22. The touch sensing array 20 comprises a plurality of electrodes. As shown in FIG. 2, the electrodes are divided into two groups, receiving electrodes R1~Rm and transmitting electrodes T1~Tn. The transmitting electrodes T1~Tn interlace with the receiving electrodes R1~Rm. There is a cross-capacitance formed between each set of the interlaced receiving and transmitting electrodes. FIG. 3 shows an exemplary embodiment of the receiver 22 in FIG. 2. The receiver 22 comprises one measurement unit U22 which comprises an integrator 220 and a calculator 221. As shown in FIG. 3, the integrator 220 comprises an amplifier A30, a capacitor Cint30, and a switch SW30. A positive input terminal (+) of the amplifier A30 is coupled to be held at an earth potential (such as 0V or ground), a negative input terminal (−) thereof is coupled to one of the receiving electrodes, and an output terminal thereof serves as an output terminal of the integrator 220. The capacitor Cint30 and the switch SW30 are coupled in parallel between the negative input terminal and the output terminal of the amplifier A30. The switch SW30 is controlled by a reset signal RESET30. The switch SW30 is turned on when the reset signal RESET30 is asserted, while the switch SW30 is turned off when the reset signal RESET30 is de-asserted. The calculator 221 is coupled to the output terminal of the integrator 220. In the embodiment in FIGS. 2-3, the receiver 22 comprises one integrator 220. That is, all receiving electrodes R1~Rm share one measurement unit U22. However, in other embodiments, the receiver 22 may comprise a plurality of measurement units with the same circuitry structure as FIG. 3, wherein the negative input terminals of the integrators in the measurement units are respectively coupled to the electrodes R1~Rm, or some of the receiving electrodes R1~Rm share one of the integrators of the measurement units. The transmitter 21 is coupled to the transmitting electrodes T1~Tn for providing voltages to the transmitting electrodes T1~Tn.

As described above, in FIG. 2, the transmitting electrodes T1~Tn interlace with the receiving electrodes R1~Rm. One cross-capacitance is formed between one set of the interlaced receiving electrode and transmitting electrode. For example, one cross-capacitance is formed between the interlaced receiving R1 and transmitting electrode T1. When a conductive object, such as a conductive stylus or a finger, touches the touch sensing array 20, values of the cross-capacitances near the conductive object are varied. The receiver 22 can obtain the values of the cross-capacitances by detecting changes in the cross-capacitances to obtain the location of the conductive object on the touch sensing array 20.

Figure 4A:
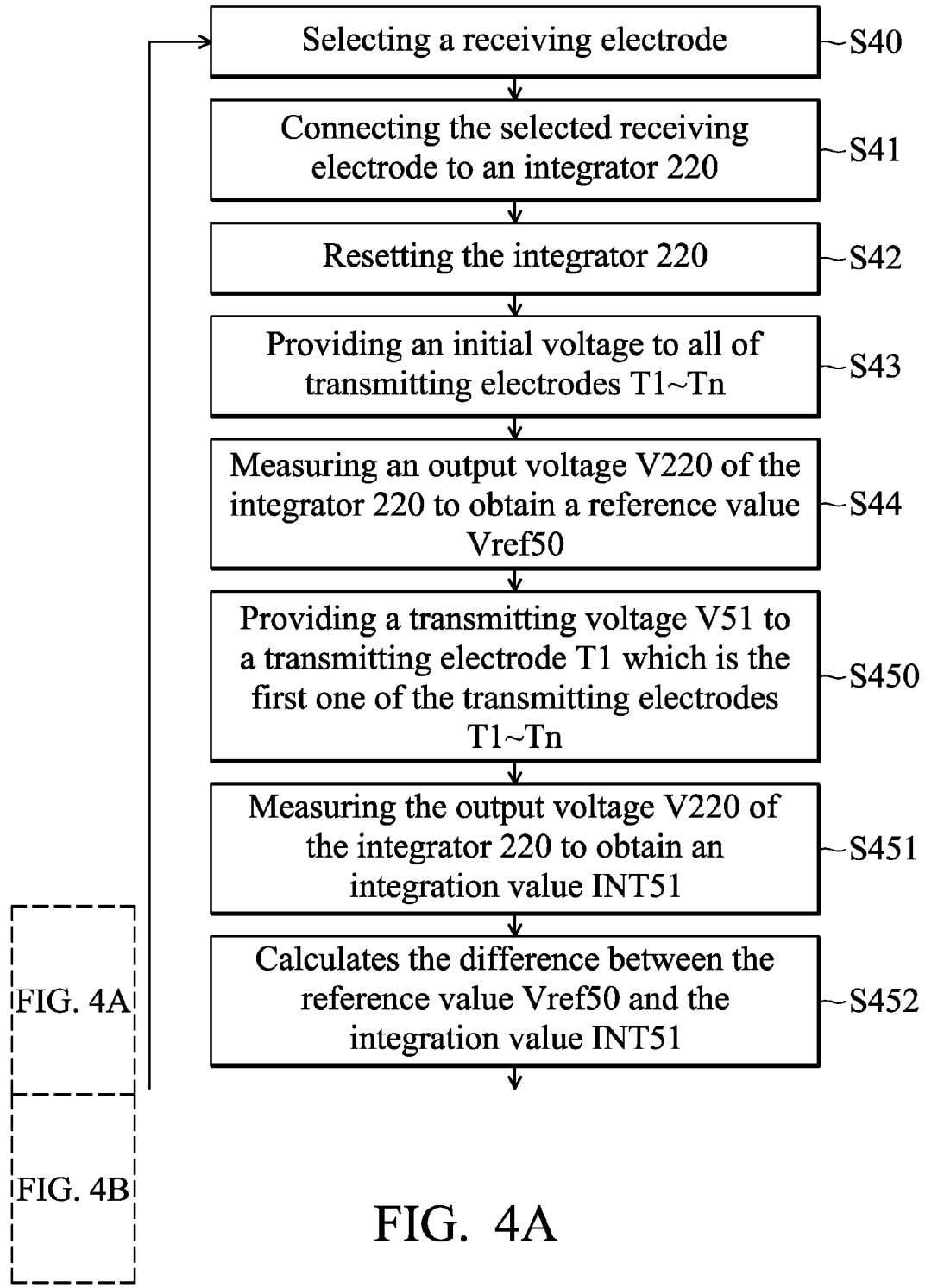
FIGS. 4A-4B show a flow chart of an exemplary embodiment of a sensing method for the touch sensing device in FIG. 2.
Figure 4B:
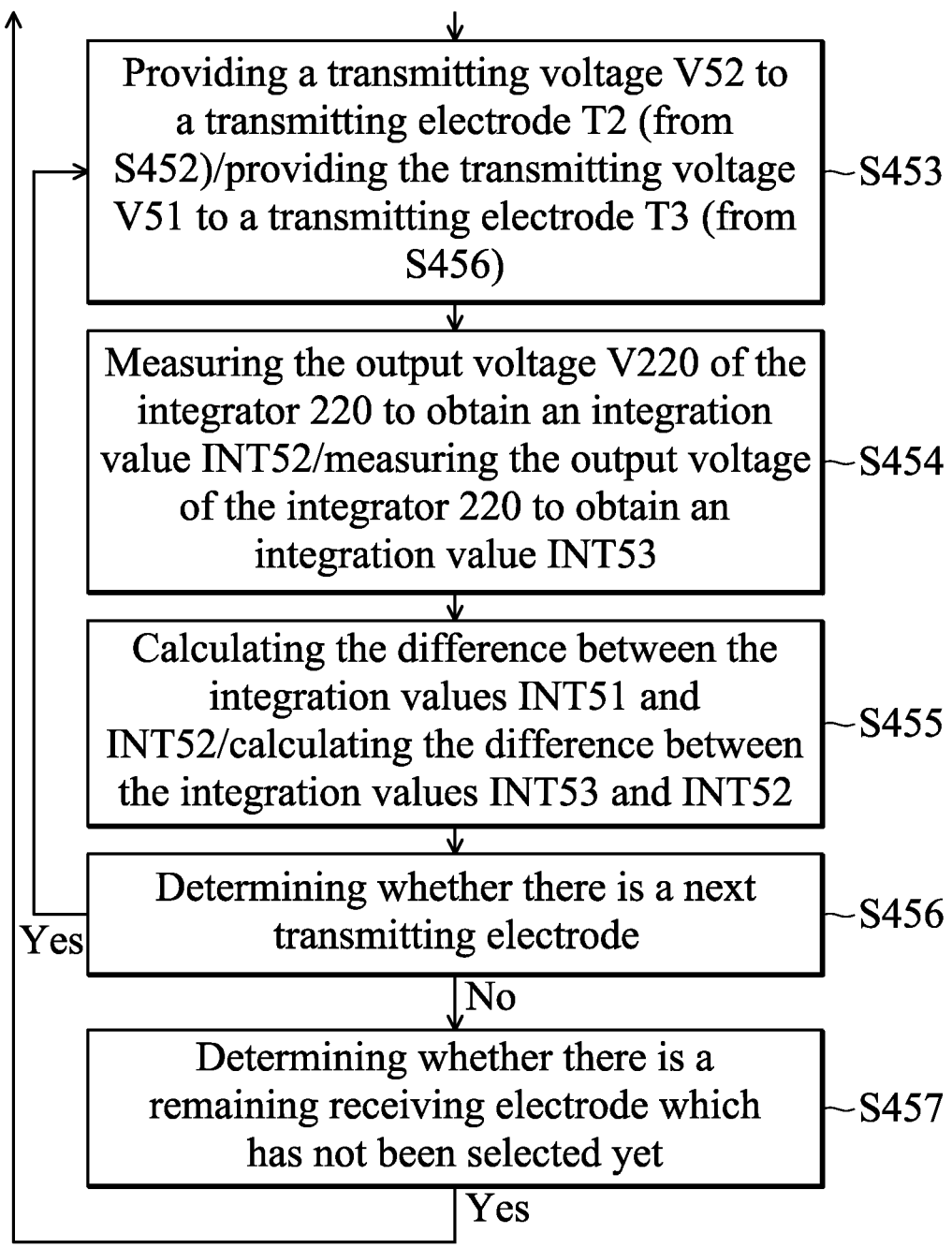
Figure 5A:
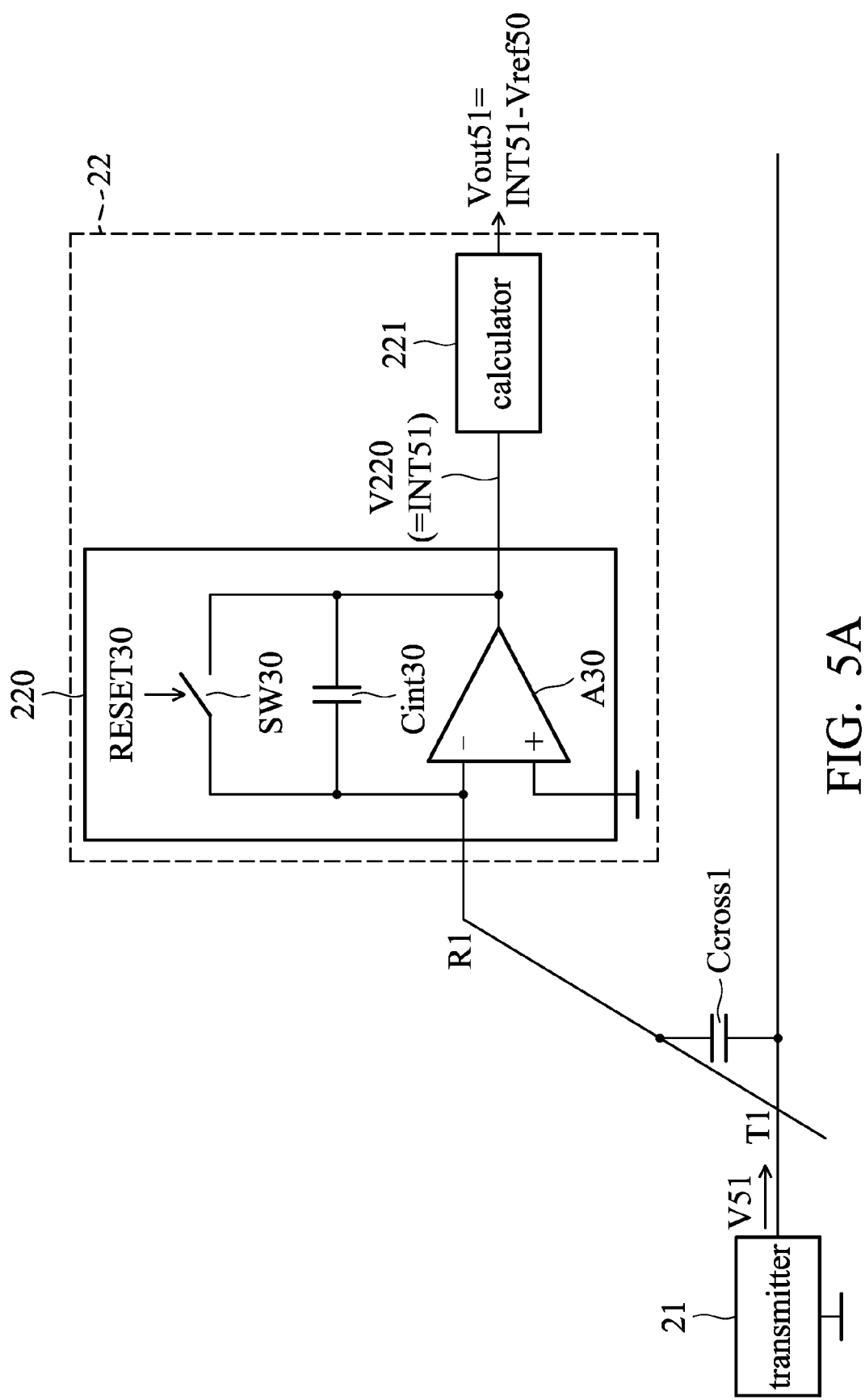
FIGS. 5A-5C show parts of the touch sensing device in FIG. 2 to explain the sensing method in FIGS. 4A-4B.
Figure 5B:
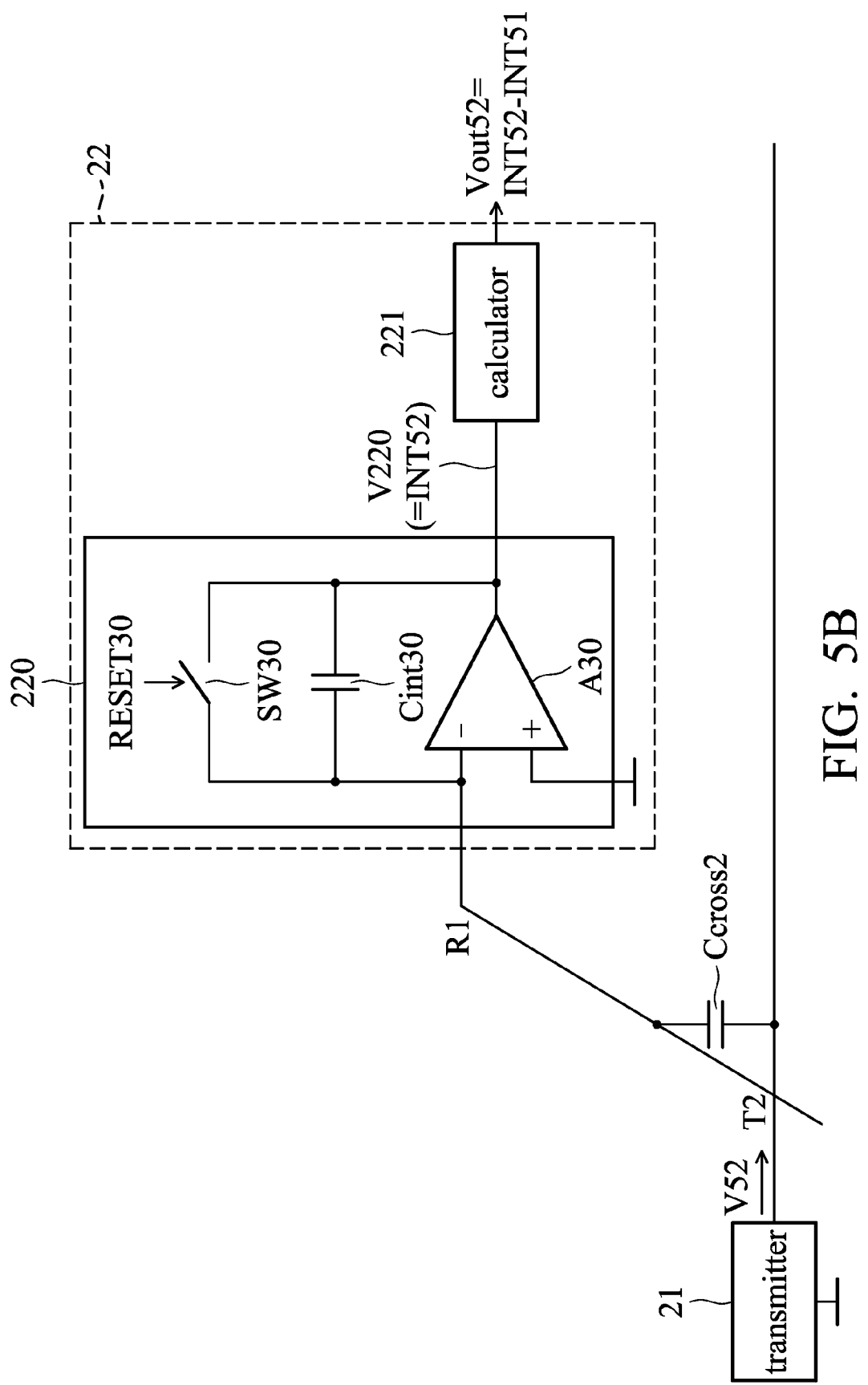
Figure 5C:
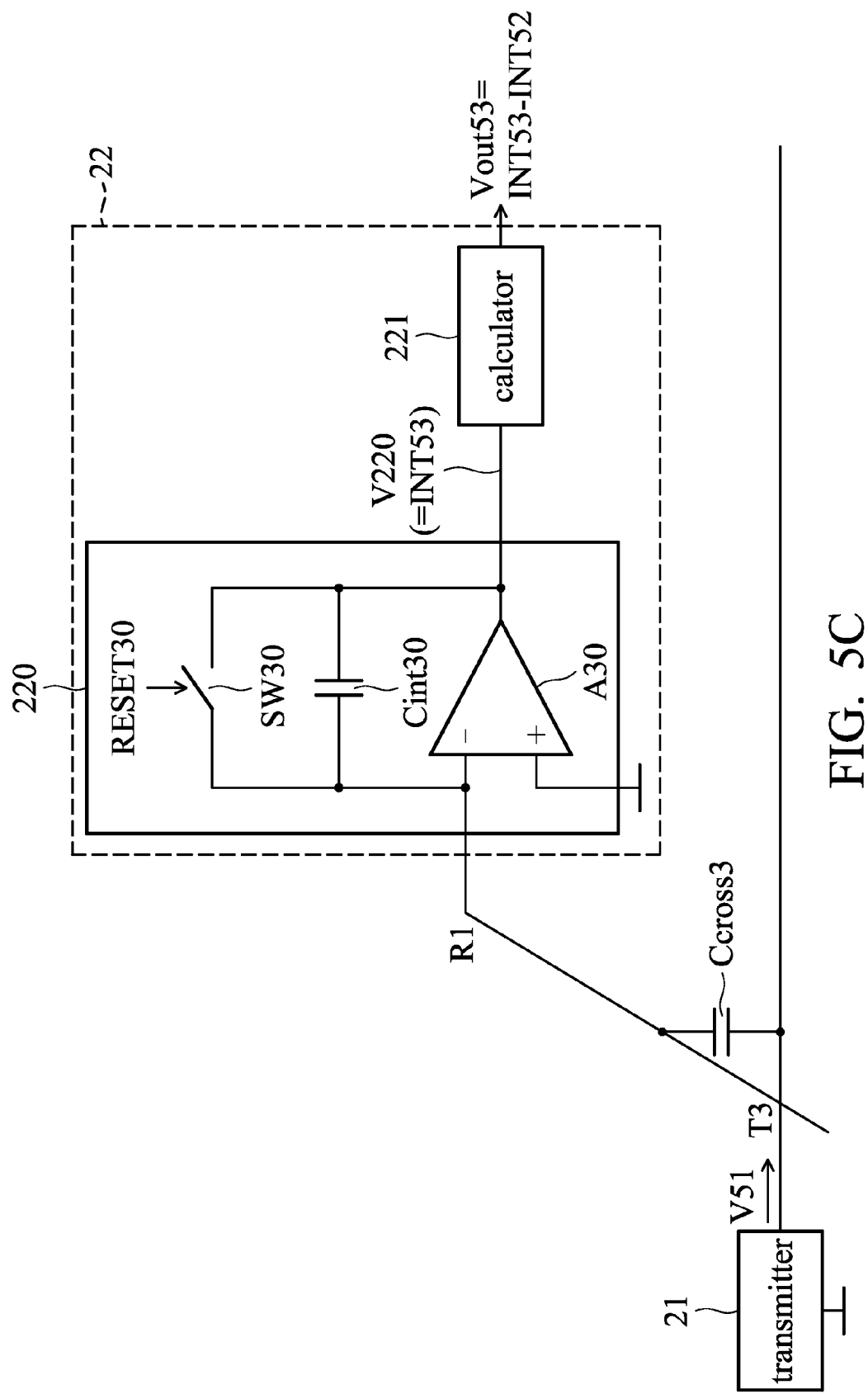
Figure 6:
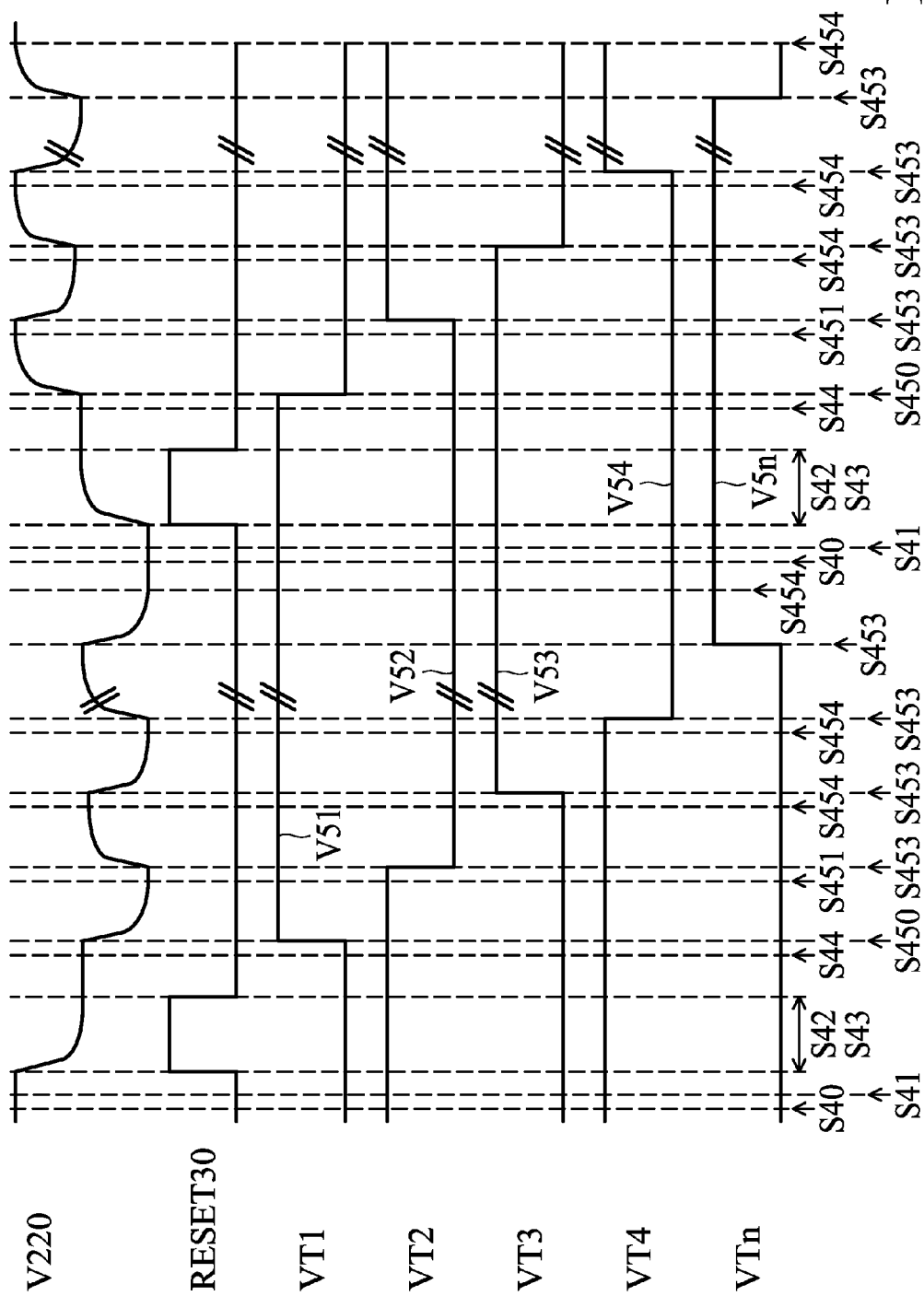
FIG. 6 shows key waveforms of the touch sensing device in FIG. 2.

FIGS. 4A-4B show a flow chart of an exemplary embodiment of a sensing method for the touch sensing device 2. FIGS. 5A-5C show parts of the touch sensing device in FIG. 2 to explain the sensing method in FIGS. 4A-4B. For clear description, FIGS. 5A-5C show one receiving electrode R1, the transmitter 21, and the integrator 220 and the calculator 221 of the receiver 22. FIGS. 5A-5C show parts of the touch sensing device in FIG. 2 to explain the sensing method in FIGS. 4A-4B. FIG. 6 shows waveforms of the output voltage V220 of the integrator 220, the reset signal RESET30, and voltages VT1~VTn on the transmitting electrodes T1~Tn and the relationship between these waveforms and steps of FIGS. 4A-4B. In the following, by taking one receiving electrode and three transmitting electrodes as an example, the sensing method will be described. Referring to FIGS. 5A-5C, first, among the receiving electrodes, one receiving electrode is selected for the measurement of the cross-capacitance associated with the selected receiving electrode. In the embodiment, the receiving electrode R1 is selected for the measurement of the cross-capacitances between the receiving electrode R1 and the transmitting electrodes T1~Tn (step S40). The negative input terminal (−) of the amplifier A30 of the integrator 220 is connected to the selected receiving electrode R1 (step S41). Then, the integrator 220 is reset by turning on the switch SW30 according to the asserted reset signal RESET30 (step S42). Due to the resetting, the earth potential at the positive input terminal (+) of the amplifier A30 is transmitted to the receiving electrode R1. The transmitter 21 provides initial voltages to all of the transmitting electrodes T1~Tn (step S43). In other words, the voltages VT1~VTn on the transmitting electrodes T1~Tn are set at initial levels. The initial voltages provided to the transmitting electrodes T1~Tn causes charges to be coupled to the receiving electrode R1 through the cross-capacitances between the receiving electrode R1 and the transmitting electrodes T1~Tn. Since the negative input terminal (−) of the amplifier A30 is coupled to the receiving electrode R1, the charges caused by the initial voltages are also coupled to integrator 220. However, since the integrator 220 is held in the reset state (step S42) these charges are not integrated. In an embodiment, the steps S42 and S43 occur simultaneously. Then, the integrator 220 is taken out of the reset state and the calculator 221 measures an output voltage V220 of the integrator 220 in response to the initial voltages to obtain a reference value Vref50 (step S44). After the step S44, the sensing method proceeds to a process of measuring output signals corresponding to the receiving electrode R1 and the transmitting electrodes T1~Tn by the receiver 22. The receiver 22 can detect changes in the cross-capacitances between the receiving electrode R1 and the transmitting electrodes T1~Tn according to the output signals to obtain the values of the cross-capacitances and further obtain a location of a conductive object on the touch sensing array 20 when it touches the touch sensing array 20.

Referring to FIGS. 4A-4B, 5A, and 6, in the process of measuring the output signals, the transmitter 21 is switched to provide a transmitting voltage V51 to the transmitting electrode T1 (the transmitting electrode T1 serves as a previous transmitting electrode) which is the first one of the transmitting electrodes T1~Tn (step S450). In the embodiment, the transmitting voltage V51 provided to the transmitting electrode T1 is more positive than the initial voltage on T1. The transmitting voltage V51 provided to the transmitting electrode T1 causes charges to be coupled to the receiving electrode R1 through the cross-capacitances Ccross1 between the receiving electrode R1 and the transmitting electrode T1. Then, the calculator 221 measures the output voltage V220 of the integrator 220 in response to the transmitting voltage V51 to obtain an integration value INT51 (the integration value INT51 serves as a previous integration value) (step S451). The calculator 221 calculates the difference between the reference value Vref50 and the integration value INT51 (step S452) to obtain the output value Vout51 corresponding to the receiving electrode R1 and the transmitting electrode T1. In the embodiment, the output value Vout51 is equal to (INT51−Vref50). The output value Vout51 represents the charge coupled via the cross-capacitances between the receiving electrode R1 and the transmitting electrode T1. Thus, the value of the cross-capacitance Ccross1 can be obtained according to the magnitude of the output value Vout51 to determine whether the interlaced area of the receiving electrode R1 and the transmitting electrode T1 is touched by a conductive object.

Then, referring to FIGS. 4A-4B, 5B, and 6, the transmitter 21 is switched to provide a transmitting voltage V52 to the transmitting electrode T2 (the transmitting electrode T2 serves as a current transmitting electrode) which is next to the transmitting electrode T1 (step S453). In the embodiment, the transmitting voltage V52 provided to the transmitting electrode T2 is more negative than the initial voltage on T2. The transmitting voltage V52 provided to the transmitting electrode T2 causes charges to be coupled to the receiving electrode R1 through the cross-capacitances Ccross2 between the receiving electrode R1 and the transmitting electrode T2. Then, the calculator 221 measures the output voltage V220 of the integrator 220 in response to the transmitting voltage V52 to obtain an integration value INT52 (the integration value INT52 serves as a current integration value) (step S454). The calculator 221 calculates the difference between the integration value INT51 and the integration value INT52 (step S455) to obtain the output value Vout52 corresponding to the receiving electrode R1 and the transmitting electrode T2. In the embodiment, the output value Vout52 is equal to (INT52−INT51). The output value Vout52 represents the charge coupled via the cross-capacitances between the receiving electrode R1 and the transmitting electrode T2. Thus, the value of the cross-capacitance Ccross2 can be obtained according to the magnitude of the output value Vout52 to determine whether the interlaced area of the receiving electrode R1 and the transmitting electrode T2 is touched by a conductive object.

Then, referring to FIGS. 4A-4B, 5C, and 6, the receiver 22 determines whether there is a transmitting electrode among the transmitting electrodes which is next to the transmitting electrode T2 (step S456). For example, if there is a transmitting electrode T3 (serving as a following transmitting electrode) next to the transmitting electrode T2, the sensing method returns to the step S453 so that the transmitter 21 is switched to provide the transmitting voltage V53 to the transmitting electrode T3. In the embodiment, the transmitting voltage V53 provided to the transmitting electrode T3 is more positive than the initial voltage on T3. The transmitting voltage V53 provided to the transmitting electrode T3 causes charges to be coupled to the receiving electrode R1 through the cross-capacitances Ccross3 between the receiving electrode R1 and the transmitting electrode T3. Then, the calculator 221 measures the output voltage V220 of the integrator 220 in response to the transmitting voltage V53 to obtain an integration value INT53 (the integration value INT53 serves as a following integration value) (step S454). The calculator 221 calculates the difference between the integration value INT52 and the integration value INT53 (step S455) to obtain the output value Vout53 corresponding to the receiving electrode R1 and the transmitting electrode T3. In the embodiment, the output value Vout53 is equal to (INT53−INT52). The value of the cross-capacitance Ccross3 can be obtained according to the magnitude of the output value Vout53 to determine whether the interlaced area of the receiving electrode R1 and the transmitting electrode T3 is touched by a conductive object. Then, the sensing method proceeds to the determination step S456.

If there is no transmitting electrode which is next to the transmitting electrode T3, the receiver 22 determines whether there is a remaining receiving electrode among the receiving electrodes R1~Rm which has not been selected yet (step S457). For example, if there is a remaining receiving electrode R2 which has not been selected in the step S40, the sensing method returns to the step S40 to select the receiving electrode R2, and the sensing method proceeds to the step S41 to measure output signals corresponding to the receiving electrode R2 and the transmitting electrodes T1~Tn. If there is no remaining receiving electrode among the receiving electrodes R1~Rm which has not been selected yet, the sensing method is ended.

According to the above embodiment of FIGS. 2-5C, the process of measuring the output signals is performed until all of the output signals corresponding to the sets of the receiving electrodes R1~Rm and transmitting electrodes T1~Tn are obtained. Accordingly, when an object touches the touch sensing device, a location of the object on the touch sensing array 20 can be detected according to the output signals. For one set of the interlaced receiving electrode and the transmitting electrodes T1~Tn, the integrator 220 of the receiver 22 is reset only one time. Thus, the rate at which the touch sensing array is sensed can be increased. Moreover, the noise produced by the process of resetting the integrator 220 due to charge injection effects can be decreased.

In the above embodiment of FIGS. 2-5C, the transmitting voltages provided two adjacent transmitting electrodes are different. For example, the transmitting voltages V51, V53, V55 . . . , are larger than the initial voltages provided to the odd transmitting electrodes T1, T3, T5 . . . , and the transmitting voltages V52, V54, V56 . . . , are smaller than the initial voltages provided to the even transmitting electrodes T2, T4, T6 . . . . Since the transmitting voltage V51 is larger than the initial voltage and the transmitting voltage V52 is smaller than the initial voltage, the transmitting voltages V51 and V52 may have different polarities.

Figure 7:
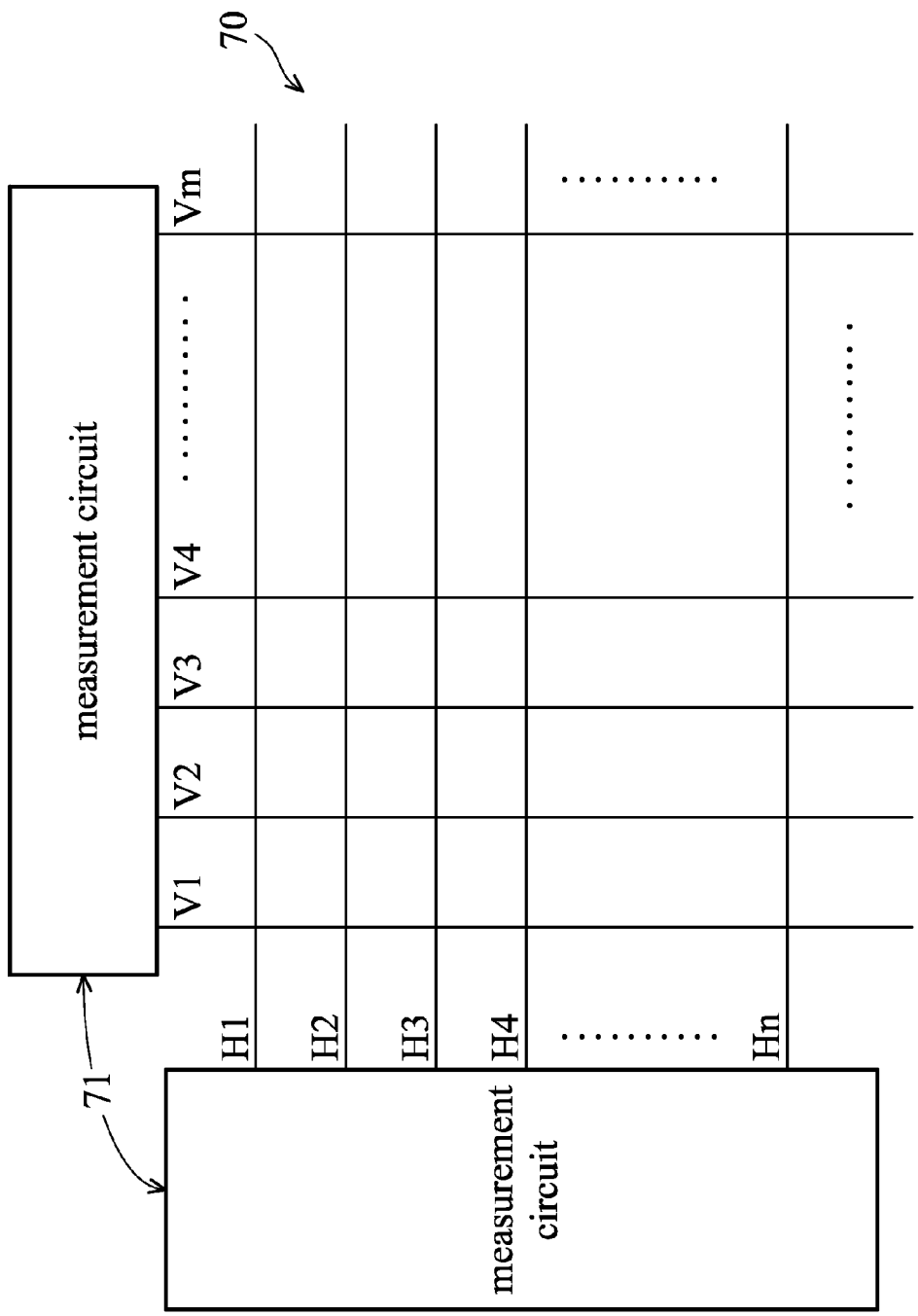
FIG. 7 shows another exemplary embodiment of a touch sensing device.
Figure 8:
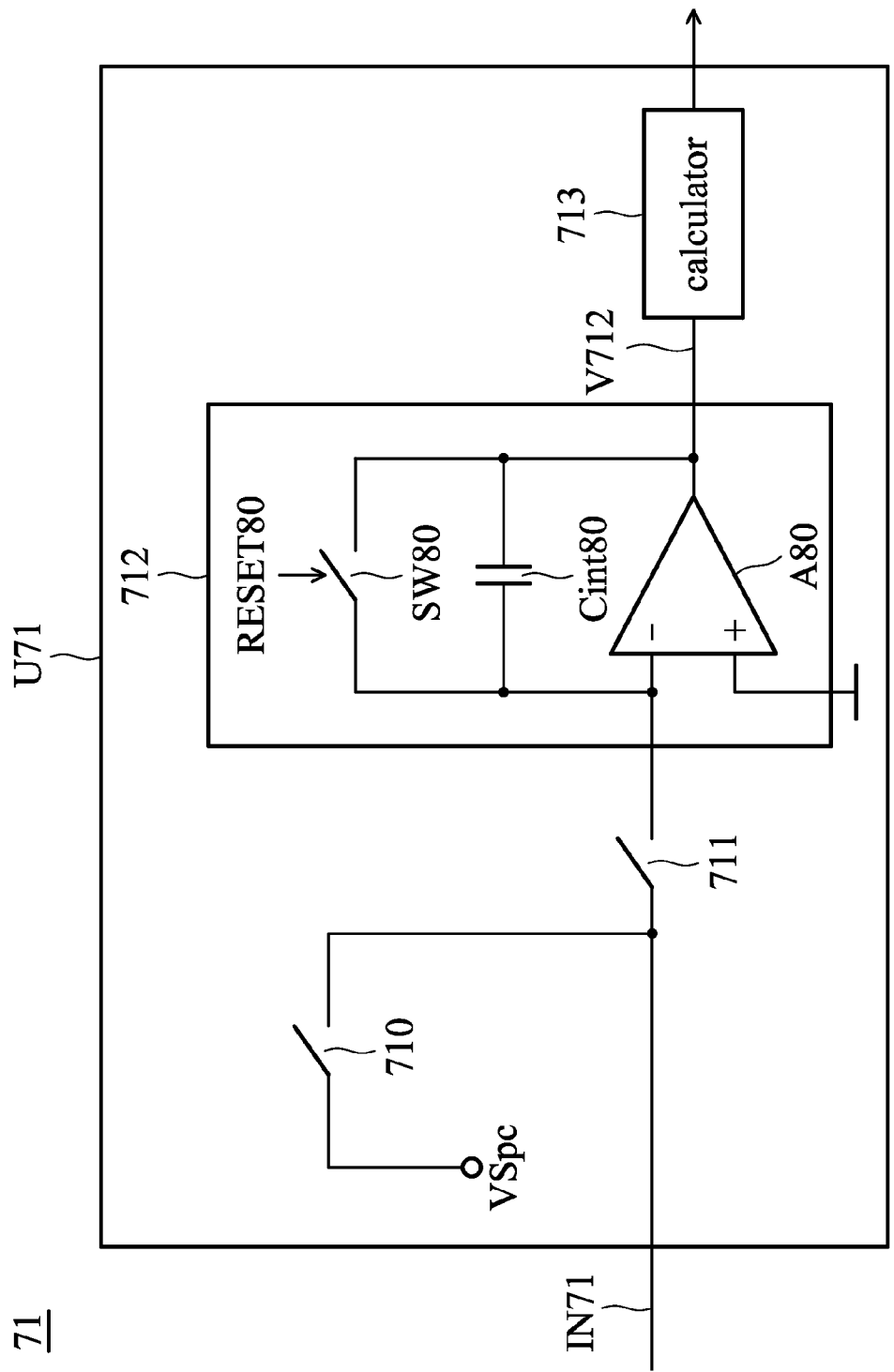
FIG. 8 shows an exemplary embodiment of a measurement circuit of the touch sensing device in FIG. 7.

FIG. 7 shows another exemplary embodiment of a touch sensing device. As shown in FIG. 7, a touch sensing device 7 comprises a touch sensing array 70 and a measurement circuit 71. The touch sensing array 70 comprises a plurality of sensing electrodes. As shown in FIG. 7, the sensing electrodes are divided into two groups: one group comprises vertical sensing electrodes V1~Vm, and the other group comprises horizontal sensing electrodes H1~Hn. The horizontal sensing electrodes H1~Hn interlace with the vertical sensing electrodes V1~Vm. There is a capacitance formed between each of the sensing electrodes V1~Vm and H1~Hn and other conducting objects or electrodes which are close to the sensing electrodes which for simplicity can be considered to be at earth potential. For example, a capacitance is formed between the vertical sensing electrode V1 and earth potential, and a capacitance is formed between the horizontal sensing electrode and the earth potential. The measurement circuit 71 is coupled to the vertical sensing electrodes V1~Vm and the horizontal sensing electrodes H1~Hn. FIG. 7 shows an exemplary embodiment of the measurement circuit 71. The measurement circuit 71 comprises one measurement unit U71 which comprises switches 710 and 711, an integrator 712, and a calculator 713. As shown in FIG. 8, the integrator 712 comprises an amplifier A80, a capacitor Cint80, and a switch SW80. The switch SW80 is controlled by a reset signal RESET80. For example, the switch SW80 is turned on when the reset signal RESET80 is asserted, while the switch SW80 is turned off when the reset signal RESET80 is de-asserted. The switch 710 is coupled between a voltage source VSpc and an input terminal IN71 of the measurement unit U71. The switch 720 is coupled between the input terminal IN71 and a negative input terminal of the amplifier A80. A positive input terminal of the amplifier A80 is coupled to the earth potential, and an output terminal thereof serves as an output terminal of the integrator 712. The capacitor Cint80 and the switch SW80 are coupled in parallel between the negative input terminal and the output terminal of the amplifier A80. The calculator 713 is coupled to the output terminal of the integrator 712. In the embodiment in FIGS. 7-8, the measurement circuit 71 comprises one measurement unit U71. That is, all sensing electrodes V1~Vm and H1~Hn share one measurement unit. However, in other embodiments, the measurement circuit 71 may comprise a plurality of measurement units with the same circuitry structure as FIG. 8, wherein the input terminals of the measurement units are respectively coupled to the sensing electrodes V1~Vm and H1~Hn, or some of the sensing electrodes V1~Vm and H1~Hn share one of the measurement circuits. For example, there are two measurement units in the measurement circuit 71, wherein all of the vertical sensing electrodes V1~Vm share one of the measurement units, and all of the horizontal sensing electrodes share the other one of the measurement units.

As described above, one capacitance is formed between each of the sensing electrodes V1~Vm and H1~Hn and the virtual earth potential. The capacitance between one sensing electrode and the earth potential is referred to as "self-capacitance" in the embodiment. When a conductive object, such as a conductive stylus or a finger, touches the touch sensing array 70, values of the self-capacitances near the conductive object are varied. The measurement circuit 71 can obtain the values of the self-capacitances by detecting charges in the self-capacitances to obtain the location of the conductive object on the touch sensing array 70.

Figure 9A:
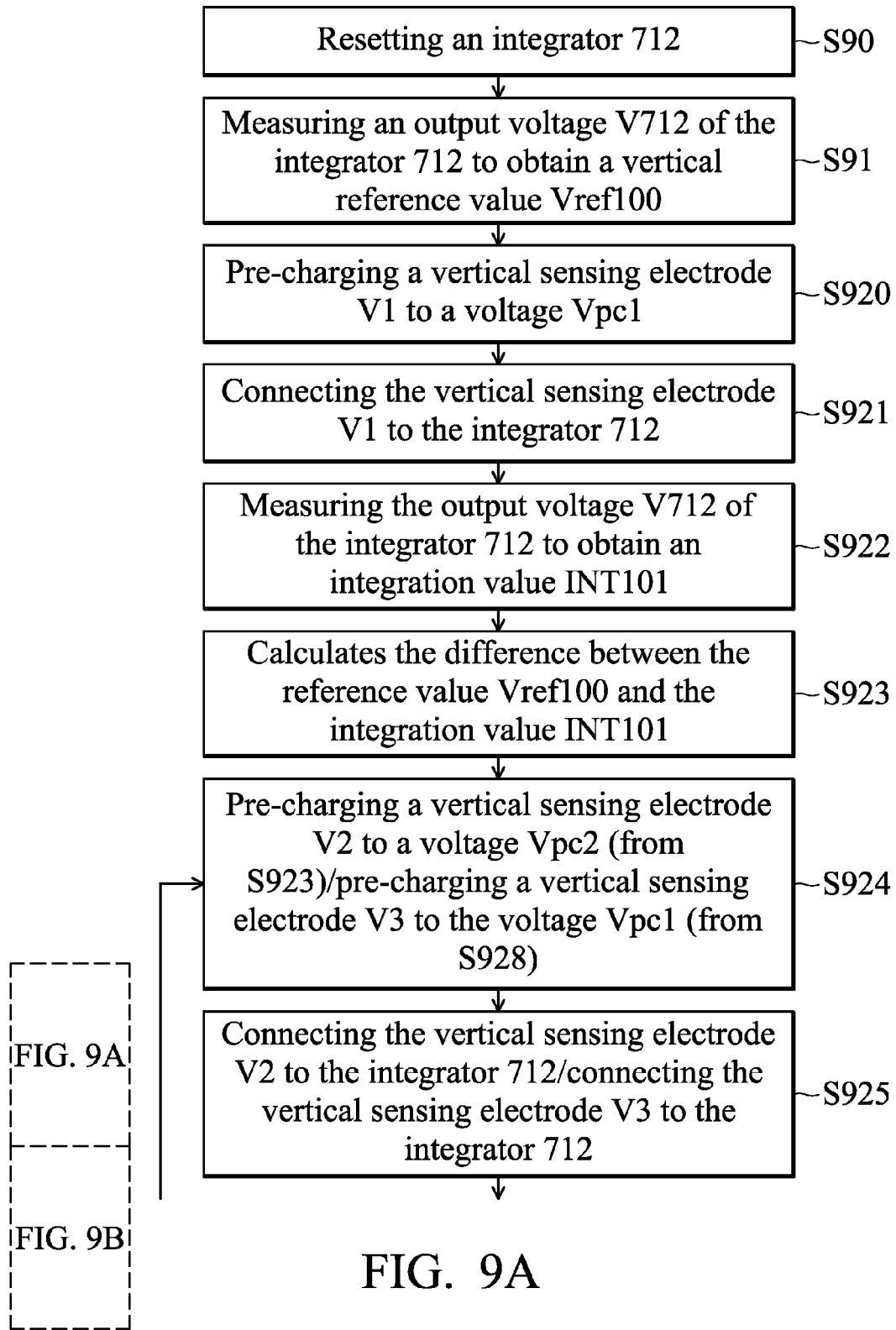
FIGS. 9A-9B show a flow chart of an exemplary embodiment of a sensing method for the touch sensing device in FIG. 7.
Figure 9B:
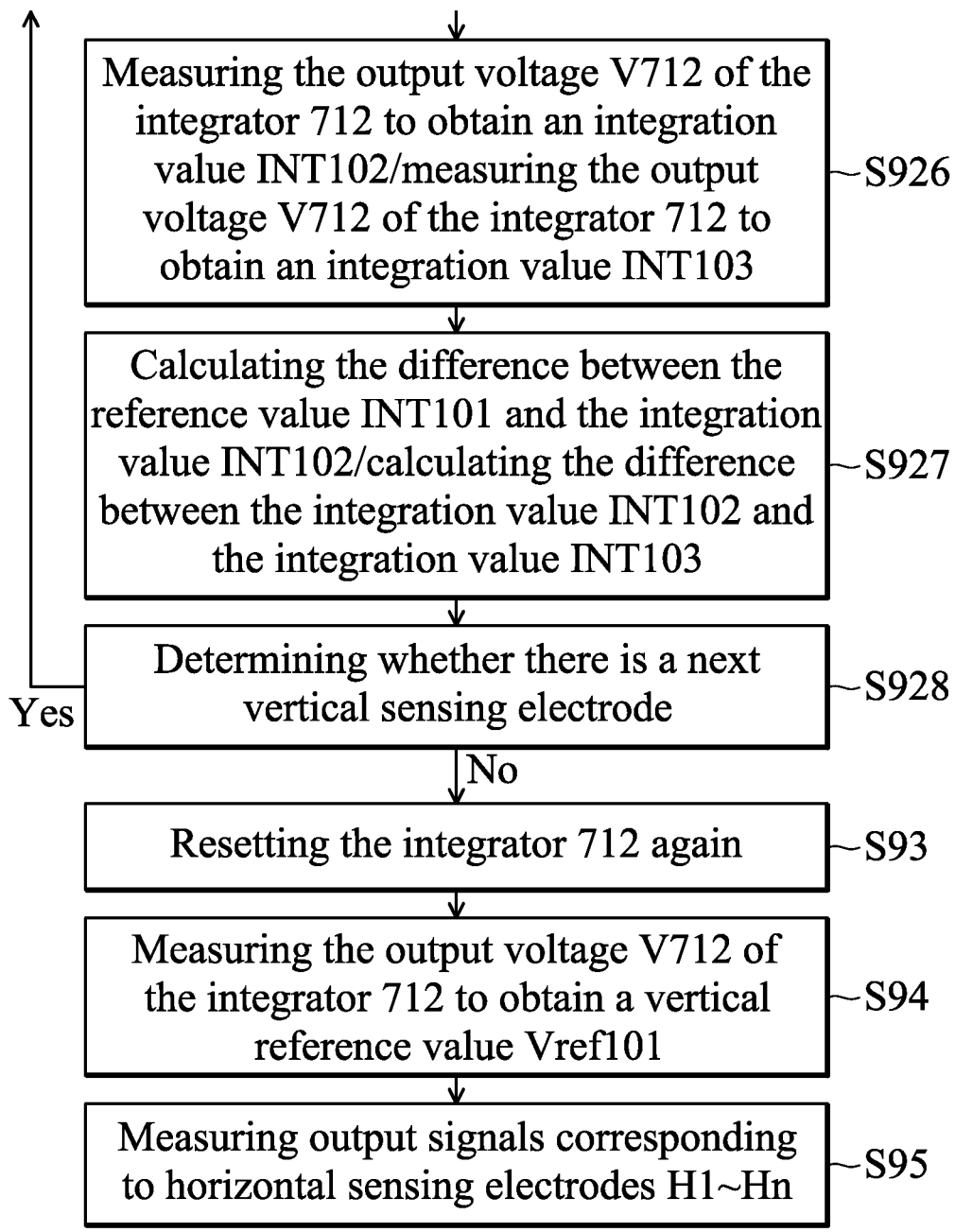
Figure 10A:
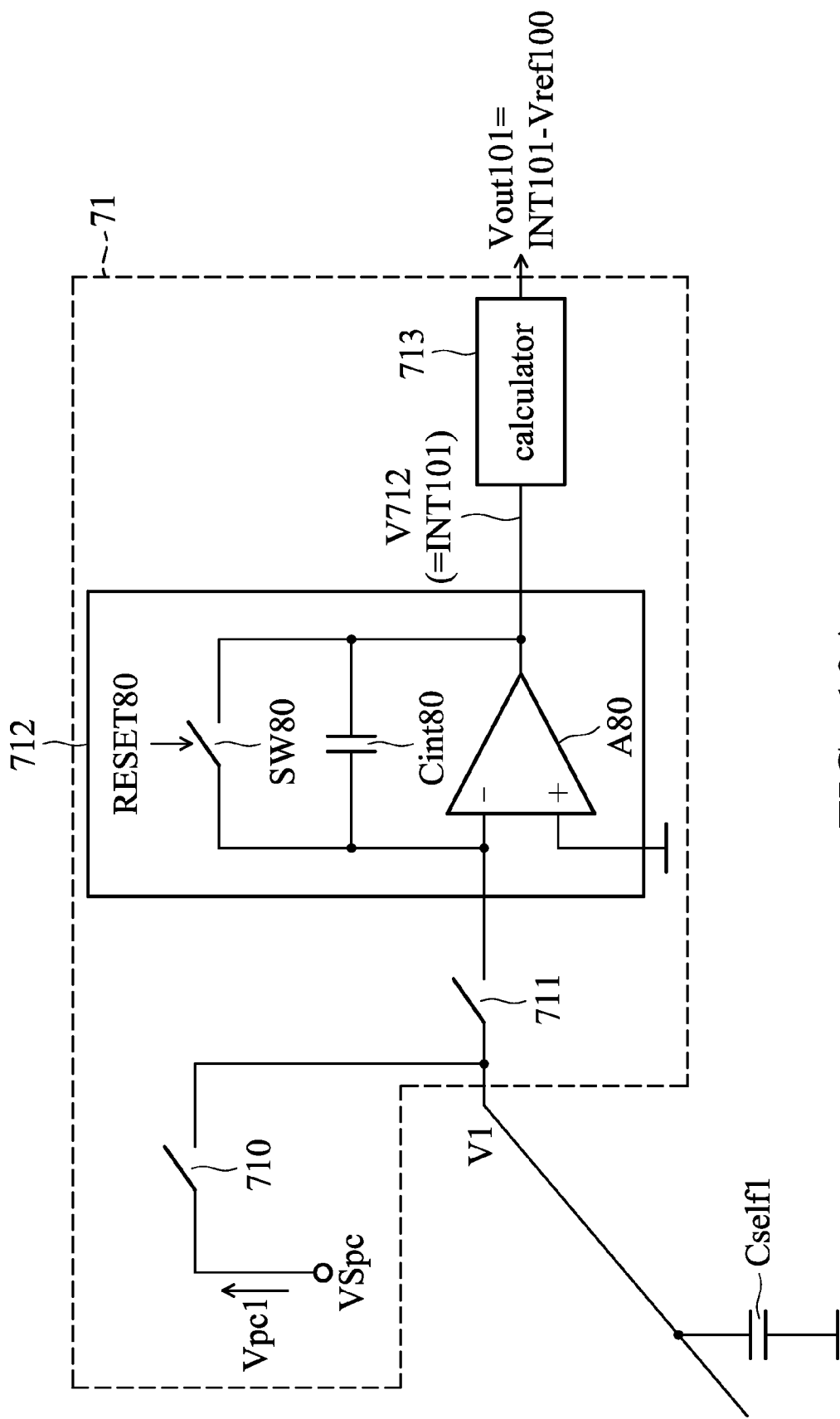
FIGS. 10A-10C show parts of the touch sensing device in FIG. 7 to explain the sensing method in FIGS. 9A-9B.
Figure 10B:
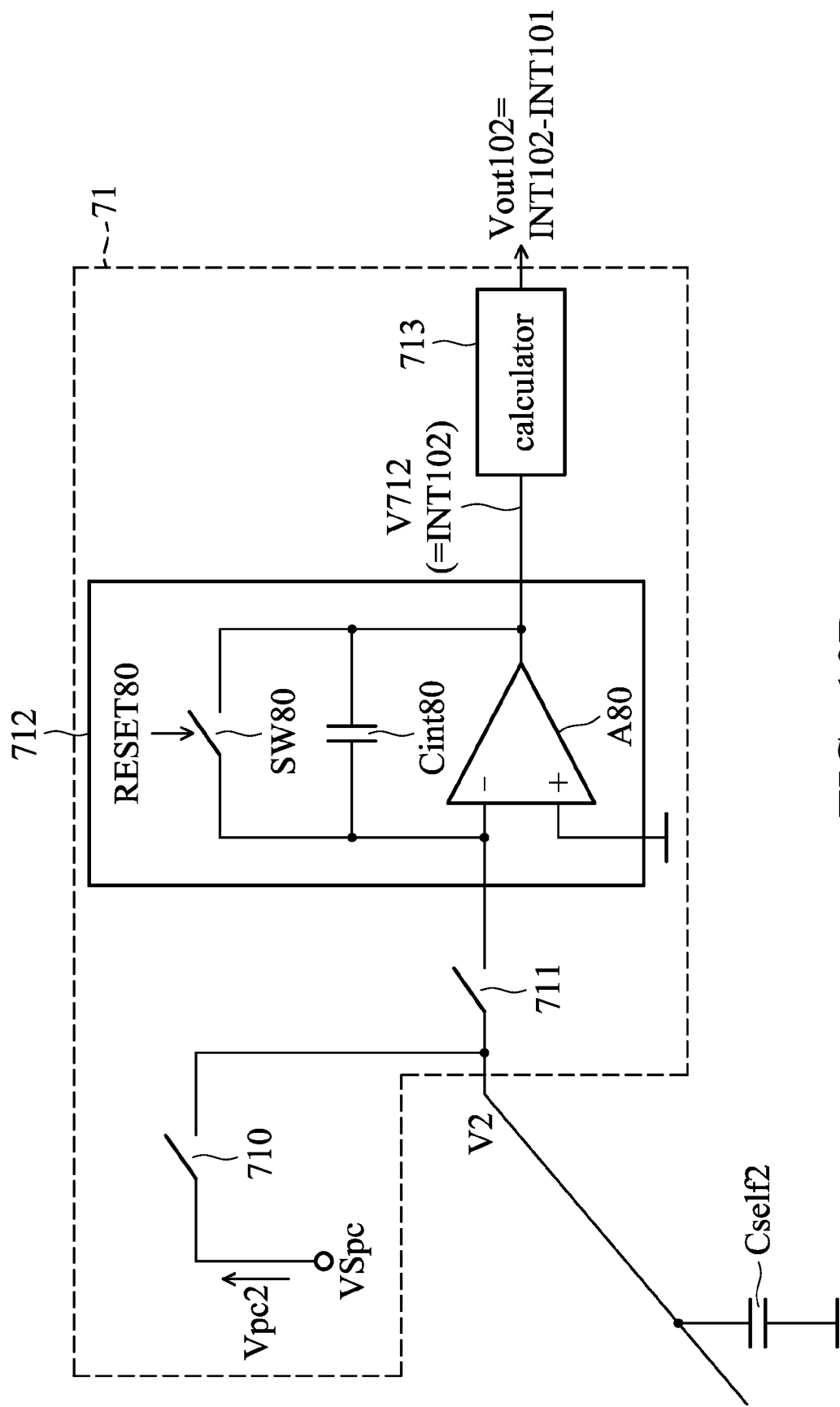
Figure 10C:
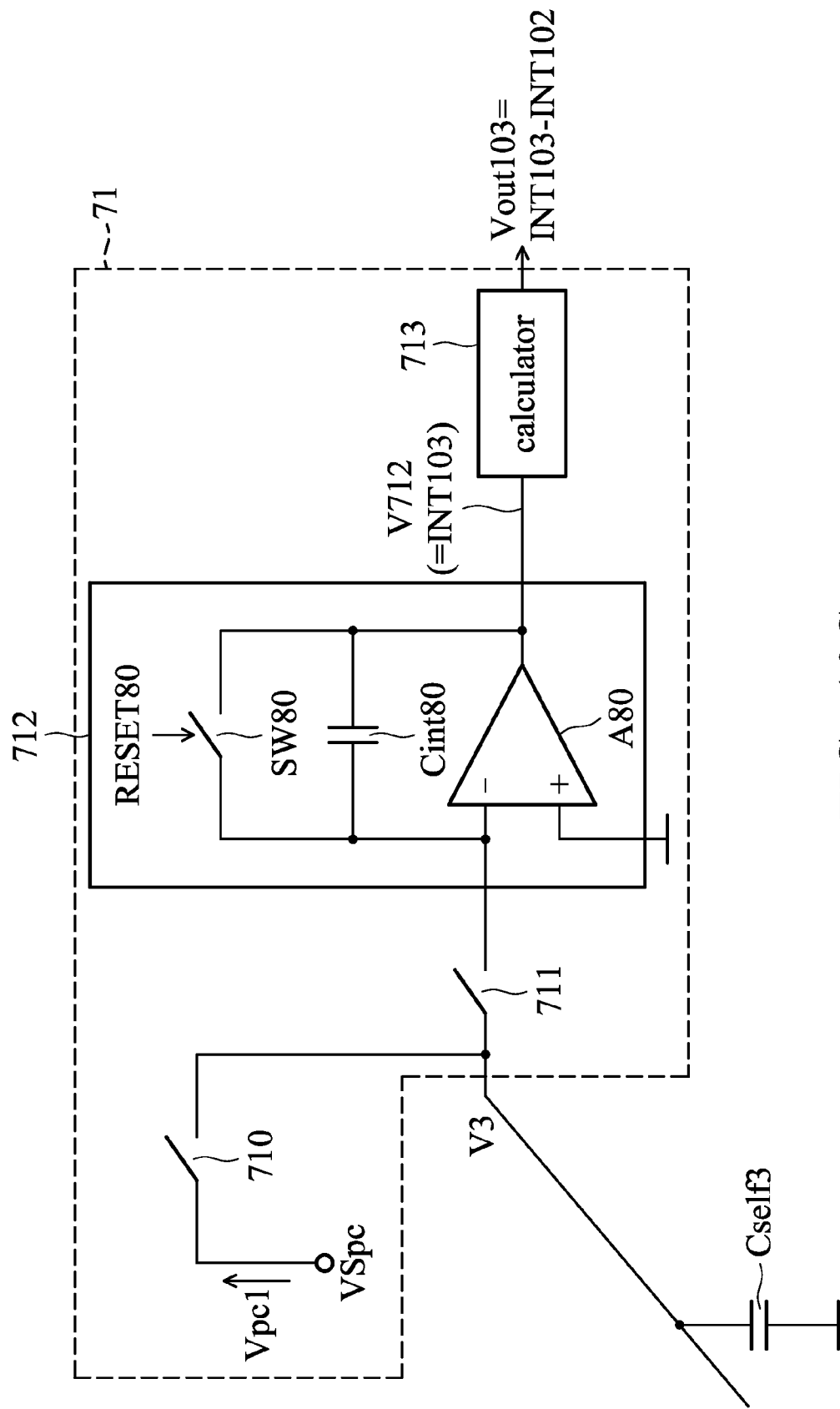

FIGS. 9A-9B show a flow chart of an exemplary embodiment of a sensing method for the touch sensing device 7. FIGS. 10A-10C show parts of the touch sensing device in FIG. 7 to explain the sensing method in FIGS. 9A-9B. For a clear description, FIGS. 10A-10C respectively shows three vertical sensing electrodes V1~V3, and all of FIGS. 10A-10C also show the measurement unit U71. In the following, referring to FIGS. 7-10C, the sensing method will be described by taking the three vertical sensing electrodes V1-V3 as an example. First, the integrator 712 is reset by turning on the switch SW80 according to the asserted reset signal RESET80 (step S90). After the integrator 712 is reset, the calculator 713 measures an output voltage V712 of the integrator 712 to obtain a vertical reference value Vref100 (step S91). After the step S91, the sensing method proceeds to a process of measuring output signals corresponding to the vertical sensing electrodes V1~V3 by the measurement circuit 71. The measurement circuit 71 can sequentially detect charges in the self-capacitances between the vertical sensing electrodes V1~V3 and the earth potential according to the output signals to obtain the values of the self-capacitances and further obtain a location of a conductive object on the touch sensing array 70 when it touches the touch sensing array 60.

Referring to FIGS. 9A-9B and 10A, in the process of measuring the output signals, the vertical sensing electrode V1 (the vertical sensing electrode V1 serves as a previous vertical sensing electrode) which is the first one of the vertical sensing electrodes V1~Vm is first selected, and the measurement unit U71 is coupled to the vertical sensing electrode V1. The switch 710 is turned on to pre-charge the vertical sensing electrode V1 to a voltage Vpc1 of the voltage source VSpc (step S920). Then, the switch 711 is turned on to connect the vertical sensing electrode V1 to the negative input terminal of the amplifier A80 of the integrator 712 (step S921), and the calculator 713 measures the output voltage V712 of the integrator 712 to obtain an integration value INT101 (step S922). The calculator 713 calculates the difference between the reference value Vref100 and the integration value INT101 (step S923) to obtain the output value Vout101 corresponding to the vertical sensing electrode V1. In the embodiment, the output value Vout101 is equal to (INT101−Vref100). The output value Vout101 of the integrator 220 represents the charges in the self-capacitances between the vertical sensing electrode V1 and the earth potential. Thus, the values of the self-capacitance Cself1 can be obtained according to the magnitude of the output value Vout101 to determine whether the vertical sensing electrode V1 is touched by a conductive object.

Then, referring to FIGS. 9A-9B and 10B, the vertical sensing electrode V2 (serving as a current vertical sensing electrode) which is next to the vertical sensing electrode V1, and the measurement unit U71 is coupled to the vertical sensing electrode V2. The switch 710 is turned on again to pre-charge the vertical sensing electrode V2 to a voltage Vpc2 of the voltage source VSpc (step S924), wherein relative to the earth voltage, polarities of the voltages Vpc1 and Vpc2 are inverse. Then, the switch 711 is turned on to connect the vertical sensing electrode V2 to the negative input terminal of the amplifier A80 of the integrator 712 (step S925), and the calculator 713 measures the output voltage V712 of the integrator 712 to obtain an integration value INT102 (step S926). The calculator 713 calculates the difference between the reference value INT101 and the integration value INT102 (step S927) to obtain the output value Vout102 corresponding to the vertical sensing electrode V2. In the embodiment, the output value Vout102 is equal to (INT102−INT101). The output value Vout102 represents the charges in the self-capacitances between the vertical sensing electrode V2 and the earth potential. Thus, the values of the self-capacitance Cself2 can be obtained according to the magnitude of the output value Vout102 to determine whether the vertical sensing electrode V2 is touched by a conductive object.

Then, referring to FIGS. 9A-9B and 10C, the measurement circuit 71 determines whether there is a vertical sensing electrode among the vertical electrodes which is next to the vertical sensing electrode V2 (step S928). For example, there is a vertical sensing electrode V3 (serving as a following sensing electrode) next to the vertical sensing electrode V2, so that the measurement unit U71 may be coupled to the vertical sensing electrode V3. The sensing method returns to the step S924. The switch 710 is turned on again to pre-charge the vertical sensing electrode V3 to the voltage Vpc1 of the voltage source VSpc (step S924). Then, the switch 711 is turned on to connect the vertical sensing electrode V3 to the negative input terminal of the amplifier A80 of the integrator 712 (step S925), and the calculator 713 measures the output voltage V712 of the integrator 712 to obtain an integration value INT103 (step S926). The calculator 713 calculates the difference between the reference value INT102 and the integration value INT103 (step S927) to obtain the output value Vout103 corresponding to the vertical sensing electrode V3. In the embodiment, the output value Vout103 is equal to (INT103−INT102). The output value Vout103 represents the charges in the self-capacitances between the vertical sensing electrode V3 and the earth potential. Thus, the values of the self-capacitance Cself3 can be obtained according to the magnitude of the output value Vout103 to determine whether the vertical sensing electrode V3 is touched by a conductive object.

Referring to FIGS. 9A-9B, if there is no vertical sensing electrode which is next to the vertical sensing electrode V2, the sensing method proceeds to the next step S93 to reset the integrator 712 again by turning on the switch SW80 according to the asserted reset signal RESET80. After the integrator 712 is reset, the calculator 713 measures the output voltage V712 of the integrator 712 to obtain a vertical reference value Vref101 (step S94). After the step S94, the sensing method proceeds to a step S95 to measuring output signals corresponding to the horizontal sensing electrodes H1~Hn by the measurement circuit 71. The measurement circuit 71 can sequentially detect charges in the self-capacitances between the horizontal sensing electrodes H1~Hn and the earth potential according to the output signals to obtain the values of the self-capacitances and further obtain a location of a conductive object on the touch sensing array 70 when it touches the touch sensing array 70.

The step S95 of measuring output signals corresponding to the horizontal sensing electrodes H1~Hn comprises the same logic operations of the step S920 to S928. Thus, the description of the step S95 of measuring output signals corresponding to the horizontal sensing electrodes H1~Hn is omitted here. Note that, in the step S95, if it is determined that there is no next horizontal sensing electrode, the sensing method is ended. By performing the process of measuring output signals corresponding to the horizontal sensing electrodes H1~Hn, the output values of the measurement unit U71 represents the charges in the self-capacitances between the horizontal sensing electrodes H1~Hn and the earth potential. Thus, the values of the self-capacitances can be obtained according to the output values to determine whether one of the horizontal sensing electrodes has been touched by a conductive object.

According to the above embodiment of FIGS. 7-10C, the process of measuring the output signals is performed until all of the output signals corresponding to the sensing electrodes V1~Vm and H1~Hn are obtained. Accordingly, when an object touches the touch sensing device, a location of the object on the touch sensing array 70 can be detected according to the output signals. For each group of sensing electrodes, that is for each of the group of vertical sensing electrodes V1~Vm and the group of horizontal sensing electrodes H1~Hn, the integrator 712 of the measurement circuit 71 is reset only one time. Thus, the rate at which the touch sensing array is sensed can be increased. Moreover, the noise produced by the process of resetting the integrator 712 due to charge injection effects can be decreased.

In the above embodiment of FIGS. 7-10C, the voltages of the voltage source VSpc to which two adjacent sensing electrodes are pre-charged are different. Moreover, relative to the virtual earth voltage, polarities of the voltages Vpc1 and Vpc2 are inverse. For example, the odd vertical sensing electrodes V1, V3, V5 . . . are pre-charged to the voltage Vpc1 with the positive polarity, while the even vertical sensing electrodes V2, V4, V6 . . . are pre-charged to the voltage Vpc2 with the negative polarity.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sensing method for a touch sensing device which comprises a touch sensing array and an integrator, wherein the touch sensing array comprises a plurality of receiving electrodes disposed successively and a plurality of transmitting electrodes disposed successively and interlacing with the receiving electrodes, and the sensing method comprises:
    selecting one of the receiving electrodes to serve as a current receiving electrode;
    connecting the current receiving electrode to the integrator;
    resetting the integrator; and
    measuring output signals corresponding to one set of the current receiving electrode and the transmitting electrodes, wherein the step of measuring the output signals corresponding to the current receiving electrode and the transmitting electrodes comprises:
    providing a first voltage to a previous transmitting electrode among the transmitting electrodes;
    measuring an output voltage of the integrator in response to the first voltage on the previous transmitting electrode to obtain a previous integration value;
    providing a second voltage to a current transmitting electrode among the transmitting electrodes;
    measuring the output voltage of the integrator in response to the second voltage on the current transmitting electrode by the integrator to obtain a current integration value; and
    calculating the difference between the previous integration value and the current integration value to obtain the output signal corresponding to the current receiving electrode and the current transmitting electrode;
    wherein for the set of the current receiving electrode and the transmitting electrodes, the integrator is reset one time.

2. The sensing method as claimed in claim 1, wherein before the step of measuring the output signals corresponding to the current receiving electrode and the transmitting electrodes, the sensing method further comprises:
    providing initial voltages to all of the transmitting electrodes.

3. The sensing method as claimed in claim 2, wherein the initial voltages are between the first voltage and the second voltage.

4. The sensing method as claimed in claim 2 further comprising:
    measuring the output voltage of the integrator in response to the initial voltages to obtain a reference value,
    wherein the step of measuring the output signals corresponding to the current receiving electrode and the transmitting electrodes further comprises:
    calculating the difference between the reference value and the previous integration value to obtain the output signal corresponding to the current receiving electrode and the previous transmitting electrode.

5. The sensing method as claimed in claim 4, wherein the previous transmitting electrode is the first one among the successively disposed transmitting electrodes.

6. The sensing method as claimed in claim 1, wherein the step of measuring the output signals corresponding to the current receiving electrode and the transmitting electrodes further comprises:
   determining whether there is a following transmitting electrode among the transmitting electrodes;
   if there is a following transmitting electrode, providing the first voltage to the following transmitting electrode;
   measuring the output voltage of the integrator in response to the first voltage on the following transmitting electrode to obtain a following integration value; and
   calculating the difference between the current integration value and the following integration value to obtain the output signal corresponding to the current receiving electrode and the following transmitting electrode.

7. The sensing method as claimed in claim 6, wherein in the step of measuring the output signals corresponding to the first receiving electrode and the transmitting electrodes, if there is no further transmitting electrode, the sensing method further comprises:
   determining whether there is a remaining receiving electrode among the receiving electrodes which has not been selected yet,
   wherein if there is a remaining receiving electrode, the sensing method proceeds to the step of selecting one of the receiving electrodes to select the remaining receiving electrode to serve as the current receiving electrode.

8. The measurement method as claimed in claim 1, wherein when an object touches the touch sensing device, a location of the object on the touch sensing array can be detected according to the output signals.

9. The measurement method as claimed in claim 1, wherein the second voltage is different from the first voltage or the second voltage is the same with the first voltage.

10. A sensing method for a touch sensing device which comprises a touch sensing array and an integrator, wherein the touch sensing array comprises a first electrode group, and the first electrode group comprise a plurality of first sensing electrodes disposed successively, and the sensing method comprises:
   resetting the integrator; and
   measuring output signals corresponding to the first sensing electrodes of the first electrode group, wherein the step of measuring the output signals corresponding to the first sensing electrodes comprises:
   pre-charging a previous first sensing electrode among the first sensing electrodes to a first voltage;
   connecting the previous first sensing electrode to the integrator;
   measuring an output voltage of the integrator to obtain a previous first integration value;
   pre-charging a current first sensing electrode among the first sensing electrodes, to a second voltage;
   connecting the current first sensing electrode to the integrator;
   measuring the output voltage of the integrator to obtain a current first integration value; and
   calculating the difference between the previous first integration value and the current first integration value to obtain the output signal corresponding to the current first sensing electrode;
   wherein for the first electrode group, the integrator is reset one time.

11. The sensing method as claimed in claim 10 further comprising:
   measuring the output voltage of the integrator to obtain a first reference value after the integrator is reset,
   wherein the step of measuring output signals corresponding to the first sensing electrodes further comprising:
   calculating the difference between the first reference value and the previous first integration value to obtain the output signal corresponding to the previous first sensing electrode.

12. The sensing method as claimed in claim 11, wherein relative to a virtual earth voltage of the integrator, polarities of the first voltage and the second voltage are inverse.

13. The sensing method as claimed in claim 11, wherein the previous first sensing electrode is the first one among the successively disposed first sensing electrodes.

14. The sensing method as claimed in claim 10, wherein the step of measuring the output signals corresponding to the first sensing electrodes further comprises:
   determining whether there is a following first sensing electrode among the first sensing electrodes which is next to the current first sensing electrode;
   if there is a following first sensing electrode, pre-charging the following first sensing electrode to the first voltage;
   connecting the following first sensing electrode to the integrator;
   measuring the output voltage of the integrator to obtain a following first integration value; and
   calculating the difference between the current first integration value and the following first integration value to obtain the output signal corresponding to the following first sensing electrode.

15. The sensing method as claimed in claim 14, wherein in the step of measuring output signals corresponding to the first sensing electrodes, if there is no further first sensing electrode, the sensing method further comprises:
   resetting the integrator again; and
   measuring output signals corresponding to a second electrode group of the touch sensing panel, wherein the second electrode group comprises a plurality of second sensing electrodes disposed successively and interlacing with the first sensing electrodes,
   wherein the step of measuring the output signals corresponding to the second sensing electrodes of the second electrode group comprises:
   pre-charging a previous second sensing electrode among the second sensing electrodes to one of the first and second voltages;
   connecting the previous second sensing electrode to the integrator;
   measuring the output voltage of the integrator to obtain a previous second integration value;
   pre-charging a current second sensing electrode among the second sensing electrodes to the other of the first and second voltages;
   connecting the current second sensing electrode to the integrator;
   measuring the output voltage of the integrator to obtain a current second integration value; and
   calculating the difference between the previous second integration value and the current second integration value to obtain the output signal corresponding to the current second sensing electrode;
   wherein for the second electrode group, the integrator is reset one time.

16. The sensing method as claimed in claim 15 further comprising:
   after the step of resetting the integrator again, measuring the output voltage of the integrator to obtain a second reference value, wherein the step of measuring output signals corresponding to the second sensing electrodes further comprising:
calculating the difference between the second reference value and the previous second integration value to obtain the output signal corresponding to the previous second sensing electrode.

17. The sensing method as claimed in claim 15, wherein the step of measuring the output signals corresponding to the second sensing electrodes further comprises:
determining whether there is a following second sensing electrode among the second sensing;
if there is a following second sensing electrode, pre-charging the following second sensing electrode to the one of the first and second voltages which the previous second sensing electrode is pre-charged to;
connecting the following second sensing electrode to the integrator;
measuring the output voltage of the integrator to obtain a following second integration value; and
calculating the difference between the current second integration value and the following second integration value to obtain the output signal corresponding to the following second sensing electrode.

18. The sensing method as claimed in claim 10, wherein when an object touches the touch sensing device, a location of the object on the touch sensing array can be detected according to the output signals.

19. The measurement method as claimed in claim 10, wherein the second voltage is different from the first voltage or the second voltage is the same with the first voltage.

\* \* \* \* \*